Aug. 11, 1931.   F. FEYENS   1,818,797
HERMETIC CLOSURE FOR JOINTS SUCH AS THOSE
BETWEEN PUMP BODIES AND THEIR PLUNGERS
Filed May 31, 1928
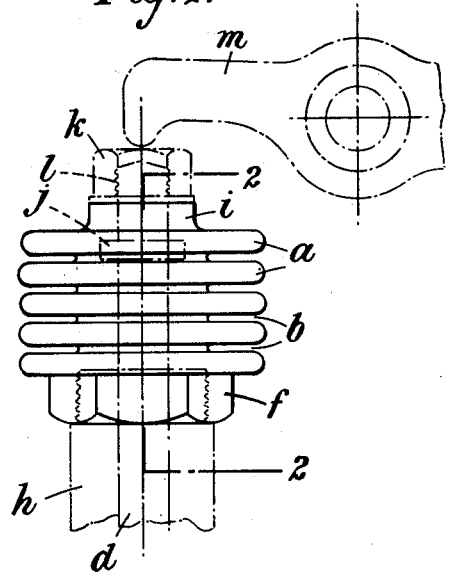
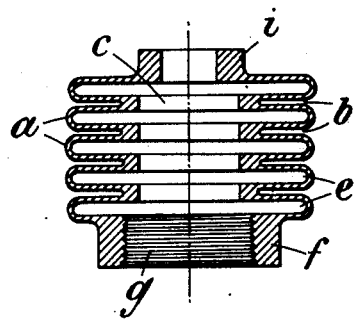
Inventor.
Francois Feyens
By Morrison Kennedy & Campbell
Attys.

Patented Aug. 11, 1931

1,818,797

UNITED STATES PATENT OFFICE

FRANÇOIS FEYENS, OF BRUSSELS, BELGIUM, ASSIGNOR TO SOCIÉTÉ GÉNÉRALE D'ETUDES INDUSTRIELLES, GENERAL RESEARCH CORPORATION, SOCIÉTÉ ANONYME, OF BRUSSELS, BELGIUM, A COMPANY OF BELGIUM

HERMETIC CLOSURE FOR JOINTS SUCH AS THOSE BETWEEN PUMP BODIES AND THEIR PLUNGERS

Application filed May 31, 1928, Serial No. 281,828, and in Belgium June 3, 1927.

This invention relates to an improved hermetic closure for joints such as those between pump bodies and their plungers, and it is particularly applicable for use in connection with injection pumps employed for injecting fuel in Diesel or similar motors, in which the packing means ordinarily used, are generally found to be inadequate to prevent the escape or leakage of the fuel owing to the very great pressure at which the latter is injected.

The object of the present invention is to overcome these difficulties by the adoption of a device of bellows-like construction comprising a permanently connected series of flexible metallic discs hollowed internally so as to form an air or gas-tight resilient metallic closure or seal for use in place of the usual packing.

The corrugated expansible chamber or bellows thus constituted, is rigidly attached on the one hand to the pump body, and on the other hand to the piston rod or plunger axially slidable in said body, and by reason of its resilience it acts as a spring for returning the said rod. It, moreover, enables very accurately gauged charges of the liquid to be injected, in view of the fact that none of the liquid is allowed to escape.

One constructional form of the invention, given merely by way of example, is illustrated in the accompanying drawings as suitable for application to a Diesel motor. In these drawings:—

Figure 1 is a side elevation of the device as mounted upon an injection pump, a small fragment of which only, is shown in dotted lines, and Figure 2 is a vertical section taken on the line 2—2 of Figure 1.

As shown in these figures, the improved packing device is or may be constituted by a series of discs $a$ formed by grooves $b$ being cut to a certain depth externally in a cylindrical metallic block, by turning or in other suitable manner.

This externally grooved cylindrical block is then bored out internally at $c$, Figure 2, the discs $a$ being subsequently internally channelled as at $e$.

The block thus formed with alternate internal and external recesses may be regarded as constituting a bellows with metallic walls, the said bellows after tempering, being capable of functioning as a spring.

As shown in Figure 2, the spring bellows formed by the said series of flexible discs $a$ terminates at its lower extremity in a collar or nut $f$ internally screw-threaded as at $g$, so as to enable it to be screwed upon corresponding threads provided on the pump body $h$ as shown in dotted lines in Figure 1.

At its upper extremity, the spring bellows is provided with a sleeve or collar $i$ which enables it to be secured between a collar or shoulder $j$ near the upper extremity of the piston rod $d$ and the lower face of a blind nut or cap $k$ screwed upon the threaded extremity $l$ of this rod as shown in dotted lines in Figure 1. By these means the rod $d$ and the body in which it is axially movable are maintained in constant hermetically sealed connection which is capable of resisting all pressures to which it is liable to be exposed.

By reason of the resilience of the before described packing connecting the pump body and the rod of the latter, it is clear that this packing will permit the rod to be moved by its actuating means, for example the tappet $m$, and cause the said rod automatically to return when said actuating means ceases to act upon it.

It will be obvious that the improved packing device instead of being formed by annular grooves produced in a cylindrical block, may equally well be manufactured from a cylindrical flanged tube with narrow ribs or partitions and provided with the necessary corrugations.

Having described my invention, I declare that what I claim and desire to secure by Letters Patent is:—

1. A combined seal and retracting spring for the pump plunger of a fuel injecting pump in which the plunger projects at one end beyond the end of the pump body and is moved inwardly on its power stroke, said combined seal and retracting spring comprising a one piece integral resilient casing formed with circumferentially extending external and internal grooves, and adapted to surround the projecting end of the plunger, said casing being provided at its outer extremity with a sleeve adapted to surround the projecting end of the plunger and to be clamped fluid tight thereto, and being provided at its inner extremity with a collar threaded interiorly to screw fluid tight on the end of the pump body; whereby the casing will act as a fluid tight seal between the plunger and pump body, and on being contracted on the power stroke of the plunger, the casing will by its expansion, act as the sole means for retracting the plunger.

2. In an injection pump, the combination of a hollow pump body, a pump plunger movable endwise outwardly and inwardly in said body in performing the pumping cycle and projecting at its outer end beyond the end of said body, said plunger rod being provided near its outer extremity with an annular shoulder, a bellows-like resilient casing surrounding the projecting end of the rod and formed on its end with a sleeve surrounding the projecting end of the rod and seated against said annular shoulder, a nut screwed on the outer end of the rod and engaging the sleeve to clamp the same fixedly and fluid tight against the annular shoulder, an interiorly threaded collar on the inner end of the casing screwed fluid tight on the end of the pump body, and means adapted to act on the extremity of the rod to move the same inwardly in performing the power stroke, and thereby contract the resilient casing; whereby said casing in expanding will act as the sole means for retracting the plunger rod.

In witness whereof I have affixed my signature hereto.

FRANÇOIS FEYENS.